May 6, 1969     A. WILLIAMS     3,443,201

SELF-REGULATING BRUSHLESS PERMANENT MAGNET AC GENERATOR

Filed Oct. 28, 1966

INVENTOR
ANDREW WILLIAMS
BY *Arthur M. Sloan*
ATTORNEY

United States Patent Office 3,443,201
Patented May 6, 1969

3,443,201
SELF-REGULATING BRUSHLESS PERMANENT
MAGNET AC GENERATOR
Andrew Williams, 2943 Ventura Drive,
Santa Barbara, Calif. 93105
Filed Oct. 28, 1966, Ser. No. 590,241
Int. Cl. H02h 7/06, 9/10
U.S. Cl. 322—28                                16 Claims This invention relates to a self regulating brushless permanent magnet alternating current generator with the capability of having over, level, or under compounded voltage characteristics. The invention may be applied to any salient pole generator and is especially adaptable to rotating permanent magnet type generators.

It is a principal object of this invention to provide an improved self regulating brushless permanent magnet alternating current generator.

A further object of the invention is to provide a self-regulating brushless permanent magnet alternating current generator capable of having over compounded, level compounded or under compounded voltage characteristics.

The above and other objects and advantages of my invention will best be understood by referring to the following detailed specification of certain preferred embodiments thereof, given by way of example, and to the accompanying drawings in which.

Figure 1:
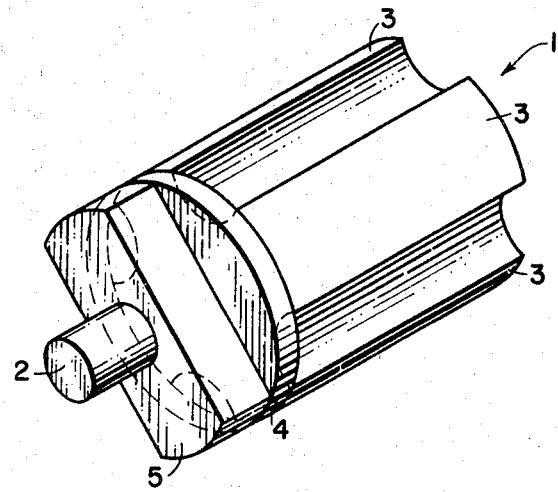
FIGURE 1 is a perspective view of a typical salient pole rotor of the invention mounted on a shaft.

The generator of this invention includes a main rotor shown in FIGURE 1 as a four-pole permanent magnet salient pole rotor 1 mounted on magnetically conductive shaft 2.

Each of the poles is designated 3. Adjacent to the four-pole rotor 1 and isolated from it by nonmagnetic spacer 4 is a two-pole steel or soft iron slug 5. The main rotor can contain any even number of poles, and the steel or soft iron slug must contain half as many poles as the main rotor. The four-pole rotor 1, the shaft 2, and the slug 5 together make up the rotating mass.

Figure 2:
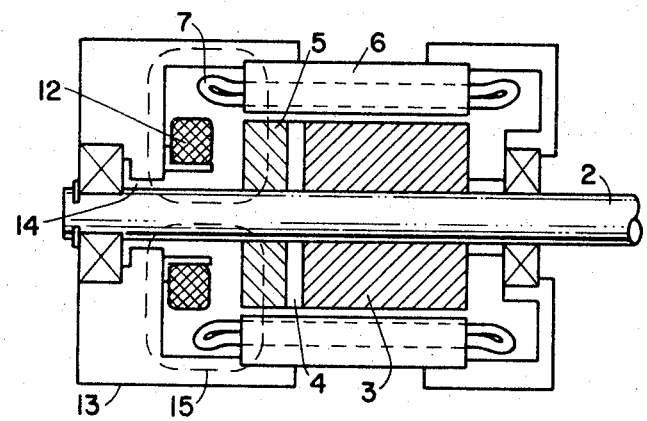
FIGURE 2 is a diagrammatic longitudinal sectional view of the assembly of the brushless permanent magnet alternating current generator of the invention.
Figure 3:
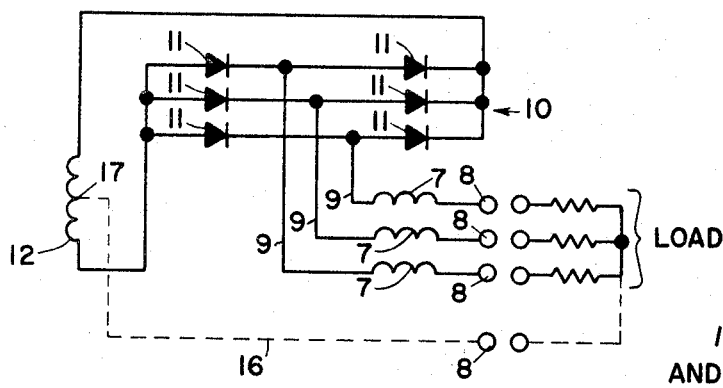
FIGURE 3 is a schematic circuit diagram showing the electrical arrangement of one embodiment of the invention.

Referring to FIGURE 2, the stator 6 is a conventional laminated multislot annulus containing a winding 7 arranged to provide an output voltage through as many phases as required. All phases are open. As shown in FIGURE 3, the stator winding line ends are connected to the output terminals 8 while the neutrals 9 go to separate legs of a full wave bridge rectifier 10. The full wave bridge rectifier includes diodes 11. The direct current output of the rectifier 10 is connected across the regulating coil 12 which is housed in the end bell 13. The regulating coil 12 is shown as a toroidal coil in FIGURE 2. The end bell 13 is made from steel or soft iron and is conductive to magnetic flux. Solid contact is made between the end bell 13 and the laminations of stator 6, but end bell 13 is separated from the shaft 2 by a narrow air gap 14.

As shown in FIGURE 3, a three-phase stator winding is employed, although any number of phases can be employed associated with an appropriate rectifier. With an open circuit no current flows and the rectifier regulating circuit is inactive. When a load, shown as resistances is applied to the stator winding 7 current flows which is converted to direct current by the bridge rectifier 10 in the neutral circuit. The direct current flows through the regulating coil 12 which energizes the slug 5 and creates the separate regulating flux path 15 through the stator 6, end bell 13, and shaft 2. By suitably proportioning the regulating coil 12 and the flux path 15 iron, the regulating flux is made to induce a voltage in the stator winding 7 which either over compounds, level compounds, or under compounds the inherent voltage induced by the permanent magnet rotor 1 for a particular specified load current.

If a neutral connection, external to the machine, is required for independent single phasing or otherwise, the neutral wire 16 is connected to a center tap 17 on the regulating coil 12 as shown by the dotted line in FIGURE 3.

Figure 4:
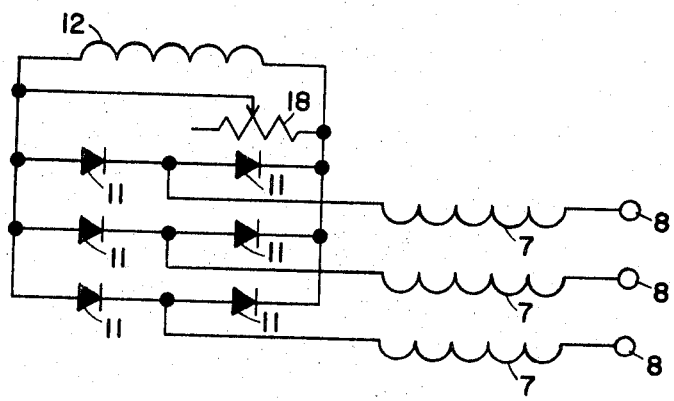
FIGURE 4 is a schematic circuit diagram showing a variation of the circuit of FIGURE 3.

As shown in FIGURE 4, a shunting potentiometer 18 may be provided across the regulating coil 12 to divert a portion of the regulating current so that fine control of the output voltage is afforded for a particular load.

Figure 5:
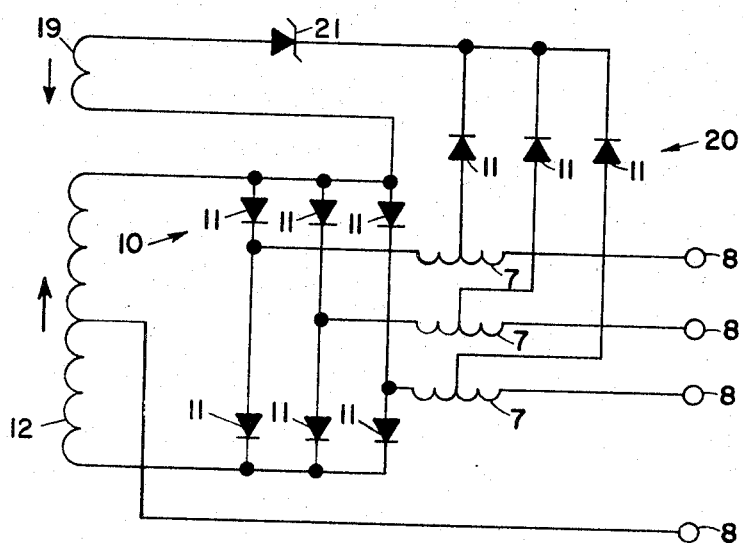
FIGURE 5 is a schematic circuit diagram showing a further improvement of the circuit of FIGURE 3.

In some instances regulation must be held to a narrow range for a varying input speed. For instance regulation mya be required to within ±10 percent. Using only one compensating or regulating coil the generator tends to over compensate in the midload range for a high speed input. At low speed the compensation ssytem works in such a manner that the output voltage stays within the required ±10 percent regulation range. To provide regulations within the required range for high speed input the circuit variation shown in FIGURE 5 is used. An additional regulating or compensation coil 19 is included. The additional compensation coil 19 is powered from a separate rectifier 20 which is comprised of diodes 11. The bridge rectifier 20 is connected in series with Zener diode 21. The diode characteristics of Zener diode 21 are chosen so that at low voltages the extra compensating coil 19 is out of the circuit. As the speed increases a voltage is reached whereat the Zener diode 21 breaks down and current flows through the extra compensating winding 19. The secondary or extra compensating winding 19 is connected so that it bucks out a portion of the flux due to the main compensating winding 12 to maintain the output voltage within the ±10 percent regulation for high input speeds.

Figure 6:
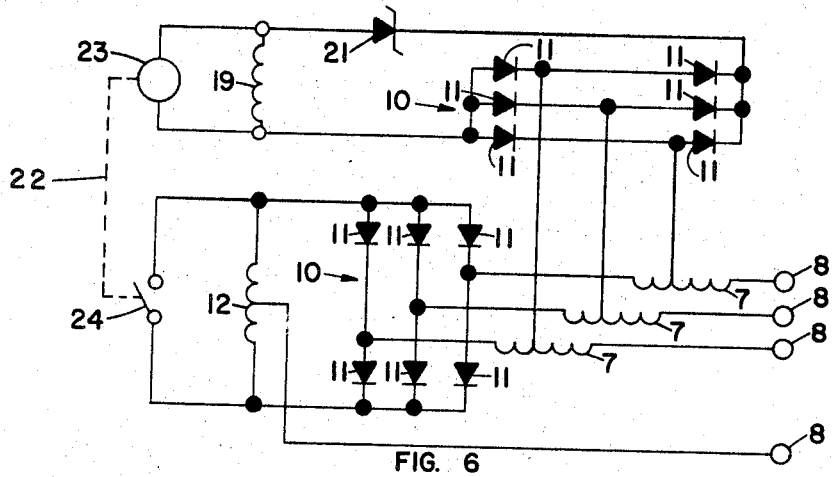
FIGURE 6 is a schematic circuit diagram of one variation of the circuit of FIGURE 5 to get further regulation.
Figure 7:
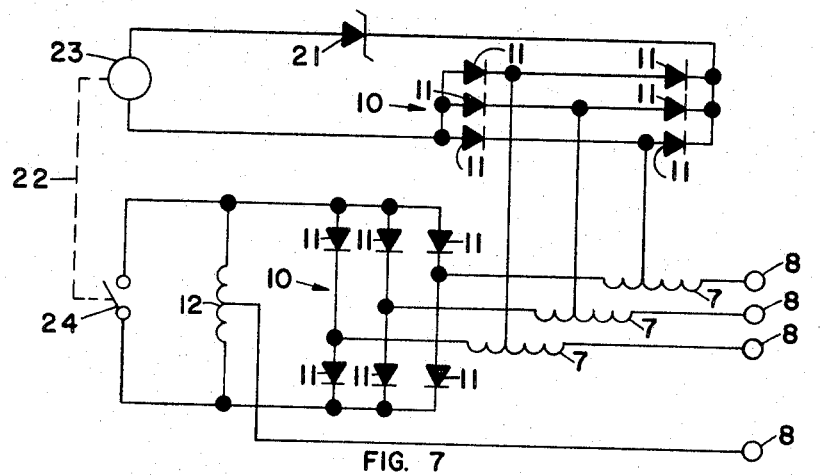
FIGURE 7 is a schematic circuit diagram of another variation of the circuit of FIGURE 5.

To get further regulation, i.e., to bring the voltage down further, the circuit variations of FIGURES 6 and 7 may be used. The circuit of FIGURE 6 operates in a manner similar to the circuit of FIGURE 5; however, the low voltage direct current relay 22 which includes operating winding 23 and normally opened trip contacts 24 is added to the circuit with the operating winding 23 in parallel with the compensation or buck coil 19 and the normally opened contacts 24 in parallel with the regulating coil 12. At low voltages the operating winding 23 is out of the circuit. As the speed increases a voltage is reached whereat the Zener diode 21 breaks down and current flows through the operating winding 23 energizing the operating winding 23 and causing the trip contacts 24 to close thereby short circuiting the regulating or boost coil 12 thus deactivating the regulating or boost coil 12 by taking it out of the circuit. The deactivating of the regulating coil 12 reduces the generated voltage. The full wave bridge rectifier 10 is substituted for the rectifier 20 to reduce ripple.

The circuit of FIGURE 7 is less effective than the circuit of FIGURE 6 in bringing the voltage down since the compensation or buck coil is omitted. In all other respects the circuit of FIGURE 7 operates as does the circuit of FIGURE 6.

Figure 8:
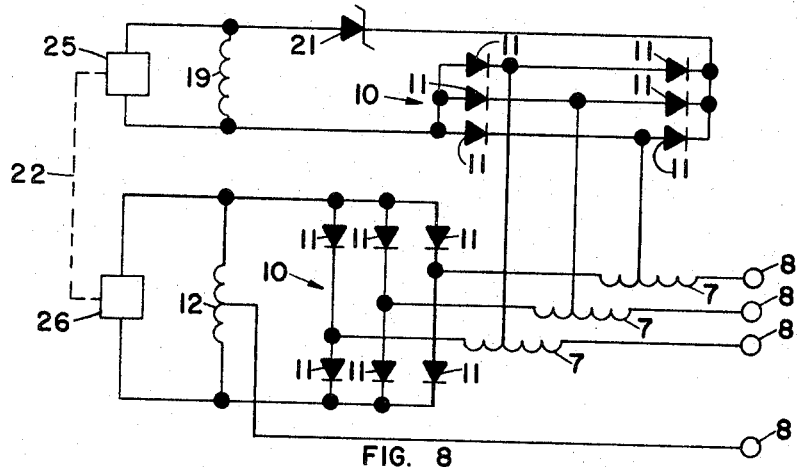
FIGURE 8 is a schematic circuit diagram of a variation of the circuit of FIGURE 6 to avoid radio interference.

In FIGURE 8 the circuit of FIGURE 6 is varied by the substitution of the activating element 25, and the semiconductor switch 26. The semiconductor switch 26 is responsive to the current flowing through the activating element 25. By substituting a semiconductor switch for mechanical contacts radio interference is reduced or avoided.

The invention has been described herein in considerable detail by way of example, but it is to be understood that many changes and variations can be accomplished therein without departing from the spirit of my invention as defined in the appended claims.

What I claim as my invention and desire to secure by Letters Patent of the United States is:

1. A self regulaing brushless permanent magnet alternating current generator comprising a magnetically conductive shaft, a permanent magnet rotor mounted on the shaft, a slug conductive to magnetic flux having half as many poles as the rotor mounted on the shaft adjacent to the rotor, a nonmagnetic spacer mounted on the shaft between the rotor and the slug to isolate the rotor from the slug, an annular stator containing a winding, said stator being disposed around and radially equidistant from the rotor and the slug, end bells conductive to magnetic flux arranged around the ends of the shaft in contact with the stator but separated from the shaft by an air gap, and means mounted in the end bell and electrically connected to the stator winding for energizing the slug and creating a separate regulating flux path through the shaft, stator, and end bell to induce a voltage in the stator winding which can be made to over compound, level compound, or under compound the inherent voltage induced by the rotor for a specified load current.

2. A self regulating brushless permanent magnet alternating current generator as described in claim 1 in which the means for energizing the slug and creating a separate regulaing flux path through the shaft, stator, and end bell comprises a rectifier regulating circuit including a full wave bridge rectifier connected to the stator winding and a regulating coil connected across the output of the full wave bridge rectifier.

3. A self regulating brushless permanent magnet alternating current generator as described in claim 2 in which the regulating coil is a toroidal coil.

4. A self regulating brushless permanent magnet alternating current generator as described in claim 2 including a neutral wire connected to a center-tap on the regulating coil to provide a neutral connection external to the machine.

5. A selft regulating brushless permanent magnet alternating current generator as described in claim 2 including a shunting potentiometer connected across the regulating coil to divert a portion of the regulating current and provide fine control of the output voltage.

6. A self regulating brushless permanent magnet alternating current generator as described in claim 2 wherein the over compounding, level compounding, or under compounding is determined by proportioning the regulating coil and flux path iron.

7. A self regulating brushless permanent magnet alternating current generator as described in claim 2 adapted to provide increased regulation of the output voltage for varying input speeds including a secondary regulating coil connected at one end in series with the full wave bridge rectifier of claim 2, an additional rectifier connected in series with the other end of the secondary regulating coil and tapped to the stator winding, and a Zener diode connected between the secondary regulating coil and the additional rectifier, wherein the Zener diode characteristics are such that at low voltages the secondary regulating coil is out of the circuit but as the speed increases a voltage is reached whereat the Zener diode breaks down and current flows through the secondary regulating coil so that the secondary regulating coil bucks out a portion of the primary regulating coil of claim 2 to maintain the output voltage with increased regulation for varying input speeds.

8. A self regulating brushless permanent magnet alternating current generator as described in claim 7 including a neutral wire connected to a center-tap on the primary regulating coil to provide a neutral connection external to the machine.

9. A self regulating brushless permanent magnet alternating current generator as described in claim 7 including means responsive to current flow through the Zener diode for deactivating the primary regulating coil.

10. A self regulating brushless permanent magnet alternating current generator as described in claim 2 adapted to provide increased regulation of the output voltage for varying input speeds including a second full wave bridge rectifier tapped to the stator winding, a secondary regulating coil connected across the output of the second full wave bridge rectifier, a Zener diode connected in series between the secondary regulating coil and the second full wave bridge rectifier, wherein the Zener diode characteristics are such that at low voltages the secondary regulating coil is out of the circuit but as the speed increases a voltage is reached whereat the Zener diode breaks down and current flows through the secondary regulating coil so that the secondary regulating coil bucks out a portion of th primary regulating coil of claim 2 to maintain the output voltage with increased regulation for varying input speeds.

11. A self regulating brushless permanent magnet alternating current generator as described in claim 10 including means responsive to current flow through the Zener diode for deactivating the primary regulating coil.

12. A self regulating brushless permanent magnet alternating current generator as described in claim 11 in which the means for deactivating the primary regulating coil includes an operating winding connected across the secondary regulating winding and a set of normally opened trip contacts connected across the primary regulating coil so that when the operating winding is energized the trip contacts close thus shorting the primary regulating coil out of the circuit.

13. A self regulating brushless permanent magnet alternating current generator as described in claim 11 adapted for reducing radio interference in which the means for deactivating the primary regulating coil includes an operating element connected across the secondary regulating winding and a semiconductor switch connected across the primary regulating coil so that when the operating element is energized the semiconductor switch closes thus shorting the primary regulating coil out of the circuit.

14. A self regulating brushless permanent magnet alternating current generator as described in claim 2 adapted to provide increased regulation of the output voltage for varying input speeds including a second full wave bridge rectifier tapped to the stator winding, a Zener diode connected in series with the output from the second full wave bridge rectifier, and means responsive to current flow through the Zener diode for deactivating the regulating coil, wherein the Zener diode characteristics are such that at low voltages no current flows through the Zener diode, but as the speed increases a voltage is reached whereat the Zener diode breaks down and current flows through the Zener diode.

15. A self regulating brushless permanent magnet alternating current generator as described in claim 14 in which the means for deactivating the regulating coil includes an operating winding connected across the output from the second full wave bridge rectifier and a set of normally opened trip contacts connected across the regulating coil so that when the operating winding is energized the trip contacts close thus shorting the regulating coil out of the circuit.

16. A self regulating brushless permanent magnet alternating current generator as described in claim 14 adapted for reducing radio interference in which the means for deactivating the regulating coil includes and operating element connected across the output from the second full wave bridge rectifier and a semiconductor switch connected across the regulating coil so that when the operating element is energized the semiconductor switch closes thus shorting the primary regulating coil out of the circuit.

References Cited

UNITED STATES PATENTS

| | | | |
|---|---|---|---|
| 2,704,343 | 3/1955 | Streuber et al. | 310—156 |
| 2,912,631 | 11/1959 | Lunberger | 310—190 |
| 3,344,338 | 9/1967 | Sparrow | 310—179 |
| 3,129,378 | 4/1964 | Raven et al. | 322—28 |
| 3,136,940 | 6/1964 | Carlson | 322—28 |
| 3,230,442 | 1/1966 | Korda | 322—28 |
| 3,289,071 | 11/1966 | Rosenberry | 322—28 |

MILTON D. HIRSHFIELD, *Primary Examiner.*

L. L. SMITH, *Assistant Examiner.*

U.S. Cl. X.R.

310—181; 322—64